US008903194B2

(12) United States Patent
Yoshizawa

(10) Patent No.: US 8,903,194 B2
(45) Date of Patent: Dec. 2, 2014

(54) IMAGE PROCESSING APPARATUS, METHOD FOR RESHAPING THRESHOLD MATRIX, AND COMPUTER-READABLE MEDIUM

(71) Applicant: Masanori Yoshizawa, Hino (JP)

(72) Inventor: Masanori Yoshizawa, Hino (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 146 days.

(21) Appl. No.: 13/759,371

(22) Filed: Feb. 5, 2013

(65) Prior Publication Data

US 2013/0208998 A1    Aug. 15, 2013

(30) Foreign Application Priority Data

Feb. 9, 2012   (JP) ................................. 2012-025922

(51) Int. Cl.
    G06F 3/00       (2006.01)
    H04N 1/405      (2006.01)
    G06T 3/00       (2006.01)

(52) U.S. Cl.
    CPC ............... G06T 3/00 (2013.01); H04N 1/4051 (2013.01)
    USPC ........... 382/293; 382/252; 382/237; 358/456; 358/3.14

(58) Field of Classification Search
    CPC ........ G06T 3/00; H04N 1/4051; H04N 1/405; H04N 1/502; G06K 15/10
    USPC ......... 382/293, 237, 239, 252; 358/456, 3.14, 358/3.19, 1.8, 3.2, 3.06, 1.9, 534, 535, 536; 430/110.3, 110.4, 111.41, 124
    See application file for complete search history.

(56) References Cited

U.S. PATENT DOCUMENTS

| | | | |
|---|---|---|---|
| 6,433,891 B1 * | 8/2002 | Yu et al. | 358/1.9 |
| 6,563,957 B1 * | 5/2003 | Li et al. | 382/252 |
| 6,798,537 B1 | 9/2004 | Lau et al. | |
| 6,985,259 B2 * | 1/2006 | Okinaka et al. | 358/3.1 |
| 8,724,164 B2 * | 5/2014 | Kakutani | 358/1.8 |
| 8,767,264 B2 * | 7/2014 | Kakutani et al. | 358/3.01 |
| 2001/0038465 A1 * | 11/2001 | Okinaka et al. | 358/456 |
| 2003/0035146 A1 * | 2/2003 | Yu et al. | 358/3.14 |
| 2006/0164688 A1 * | 7/2006 | Manuel de Pena et al. | 358/3.03 |

OTHER PUBLICATIONS

Daniel L. Lau et al., "Modern Digital Halftoning", $2^{nd}$ ed., 2008, pp. 372-375, CRC Press, USA.

* cited by examiner

Primary Examiner — Mekonen Bekele
(74) Attorney, Agent, or Firm — Buchanan Ingersoll & Rooney PC

(57) ABSTRACT

An image processing apparatus includes a probability conversion unit, a processor, and a threshold conversion unit. The probability conversion unit receives an initial pattern and converts it into a probability distribution space. The processor performs weighting on a density distribution space indicating a density of pixels determined to be dotted using the probability distribution space, determines pixels to be dotted and an order of the dotting in the weighted density distribution space, updates the probability distribution space until the order for all pixels in the initial pattern is determined, and repeats the determination using the updated probability distribution space. The threshold conversion unit converts the order of dotting into thresholds to obtain a threshold matrix. The probability conversion unit uses a threshold matrix preliminarily created to form a halftone dot as the initial pattern.

15 Claims, 9 Drawing Sheets

COMPARATIVE EXAMPLE

PRESENT EMBODIMENT

IMAGE PROCESSING APPARATUS, METHOD FOR RESHAPING THRESHOLD MATRIX, AND COMPUTER-READABLE MEDIUM

BACKGROUND OF THE INVENTION

1. Field of the Invention

The present invention relates to an image processing apparatus, a method for reshaping a threshold matrix, and a computer-readable medium.

2. Description of Related Art

A screen process determines whether to put a dot at a pixel of image data and determines the size of the dot using a threshold matrix having thresholds defined for the respective pixels. The threshold matrix defines halftone dots each consisting of a group of dots, and the size and density of the halftone dot define a gradation.

Examples of well-known conventional methods for forming a threshold matrix for frequency modulation (FM) screening include the simulated-annealing method, the void-and-cluster method, and the binary pattern pair correlation construction algorithm (BIPPCCA) (See U.S. Pat. No. 6,798,537 and Daniel L. Lau and Gonzalo R. Arce, Modern Digital Half toning, second edition, U.S.A.: CRC Press).

All the aforementioned techniques determine a threshold for each pixel based on an initial pattern of randomly arranged dots by random numbers.

The granularity of an image after the screen process is improved as the shape of each halftone dot formed with the threshold matrix is closer to a circle.

Unfortunately, the threshold matrix formed with a conventional method causes unstable shapes of halftone dots. With reference to FIG. 9, many of the halftone dots have an irregular and uneven shape. Moreover, an isolated dot arises among the halftone dots. Consequently, the screen process using such a threshold matrix produces a grainy image. This is partly because the threshold matrix is created from an initial pattern formed with the random numbers.

SUMMARY OF THE INVENTION

An object of the present invention is to provide a threshold matrix to improve the quality of an image after the screen process.

According to a first aspect of the present invention, there is provided an image processing apparatus including: a probability conversion unit that receives an initial pattern and converts the initial pattern into a probability distribution space indicating a probability of dotting; a processor that performs weighting on a density distribution space indicating a density of pixels determined to be dotted using the probability distribution space, determines pixels to be dotted and an order of dotting of the pixels to be dotted in the weighted density distribution space, updates the probability distribution space in accordance with respective positions of the pixels determined to be dotted until the order of dotting for all pixels in the initial pattern is determined, and repeats the determination of the pixels to be dotted and the order of dotting using the updated probability distribution space; and a threshold conversion unit that converts the order of dotting of the pixels determined by the processor into respective thresholds to obtain a threshold matrix, wherein the probability conversion unit uses a threshold matrix preliminarily created to form a halftone dot as the initial pattern.

According to a second aspect of the present invention, there is provided a method for reshaping a threshold matrix, the method including: (a) receiving an initial pattern and converting the initial pattern into a probability distribution space indicating a probability of dotting; (b) performing weighting on a density distribution space indicating a density of pixels determined to be dotted using the probability distribution space, determining pixels to be dotted and an order of dotting of the pixels to be dotted in the weighted density distribution space, updating the probability distribution space in accordance with respective positions of the pixels determined to be dotted until the order of dotting for all pixels in the initial pattern is determined, and repeating the determination of the pixels to be dotted and the order of dotting using the updated probability distribution space; and (c) converting the order of dotting of the pixels determined by step (b) into respective thresholds to obtain a threshold matrix, wherein step (a) uses a threshold matrix preliminarily created to form a halftone dot as the initial pattern.

According to a third aspect of the present invention, there is provided a non-transitory computer-readable medium having stored thereon computer-executable instructions which, when executed, cause a computer to perform the steps of: (a) receiving an initial pattern and converting the initial pattern into a probability distribution space indicating a probability of dotting; (b) performing weighting on a density distribution space indicating a density of pixels determined to be dotted using the probability distribution space, determining pixels to be dotted and an order of dotting of the pixels to be dotted in the weighted density distribution space, updating the probability distribution space in accordance with respective positions of the pixels determined to be dotted until the order of dotting for all pixels in the initial pattern is determined, and repeating the determination of the pixels to be dotted and the order of dotting using the updated probability distribution space; and (c) converting the order of dotting of the pixels determined by step (b) into respective thresholds to obtain a threshold matrix, wherein step (a) uses a threshold matrix preliminarily created to form a halftone dot as the initial pattern.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Embodiments of an image processing apparatus, a method for reshaping a threshold matrix, and a computer-readable medium according to the present invention will now be described with reference to the accompanying drawings.

Figure 1:
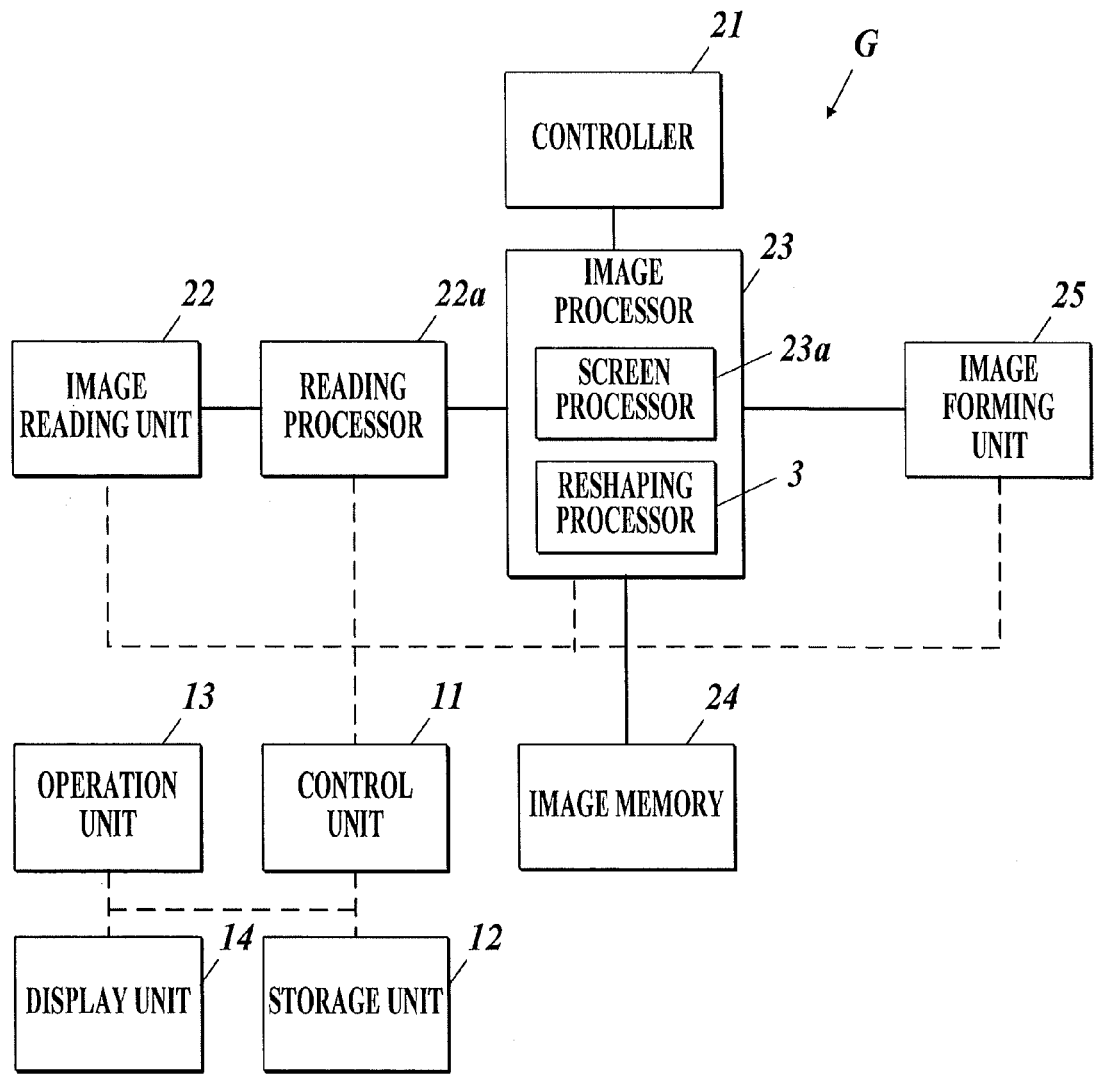
FIG. 1 is a functional block diagram of an image forming apparatus.

FIG. 1 is a functional block diagram of an image forming apparatus G. The image forming apparatus G can make copies of documents and print out data from personal computers (PCs) on a network.

As shown in FIG. 1, the image forming apparatus G includes a control unit 11, a storage unit 12, an operation unit 13, a display unit 14, a controller 21, an image reading unit 22, a reading processor 22a, an image processor 23, and an image forming unit 25.

The control unit 11 includes a central processing unit (CPU) and a random access memory (RAM), for example. The control unit 11 reads and executes a program stored in the storage unit 12 to control the operation of the units in the image forming apparatus G.

The control unit 11 controls scanning by the image reading unit 22 and image formation by the image forming unit 25, for example. The control unit 11 reads a print command of image data and permits the image processor 23 to perform an image process instructed by the print command.

The storage unit 12 stores programs to be executed by the control unit 11 and data used to execute the programs. The storage unit 12 may be a high-capacity nonvolatile memory such as a hard disk.

The operation unit 13 includes a touch panel and keys and outputs operational signals to the control unit 11 in response to the operation of the touch panel and the keys.

The display unit 14 displays various operational menus on a display integrated with the touch panel, in accordance with the display control by the control unit 11.

The controller 21 receives page-description language (PDL) data from a computer connected thereto via a network, and the PDL data is rasterized to generate bitmap image data. The controller 21 extracts the print command from the PDL data and transfers the print command to the image processor 23 along with the image data. The print command includes not only basic print commands such as the number of print copies and a print size but also optional print commands such as aggregate printing and insertion of page numbers.

The image reading unit 22 includes a scanner and scans a document to generate an analog image signal.

The reading processor 22a corrects the analog image signal with a frequency process, for example, and then performs an analog/digital (A/D) conversion thereon to generate digital image data. The resultant image data is then output to the image processor 23.

The image processor 23 performs various image processes on the input image data in response to an instruction of the control unit 11. Examples of the various image processes include: a layout process such as rotation, magnification, reduction of an image, insertion of page numbers, and aggregate printing; a screen process; and a color conversion process.

The image processor 23 includes a screen processor 23a which performs a screen process on the image data with a threshold matrix.

The image processor 23 includes a reshaping processor 3 that reshapes the provided threshold matrix and outputs the reshaped threshold matrix to the screen processor 23a.

An image memory 24 temporarily stores the image data. The image memory 24 may be a dynamic random-access memory (DRAM), for example.

The image memory 24 serves as a work memory when the image processor 23 performs an image process on the image data, and also serves as a buffer when the image processor 23 outputs the image data to the image forming unit 25 per page.

The image forming unit 25 forms a toner image on a sheet based on the image data.

More specifically, the image forming unit 25 includes an exposure section, a photosensitive drum, a developing section, and an intermediate transfer belt, for example. In printing, the exposure section exposes the photosensitive drum based on the image data converted through pulse width modulation (PWM) to form an electrostatic latent image. Then, the electrostatic latent image is developed by the developing section with toner to form a toner image on the photosensitive drum. Subsequently, the toner image is transferred onto the intermediate transfer belt from the photosensitive drum and then onto a sheet conveyed by a sheet feeding section (not illustrated). A fixing section (not shown) performs a fixing process on the sheet, and then the sheet is discharged onto a tray.

[Reshaping Processor]

Figure 2:
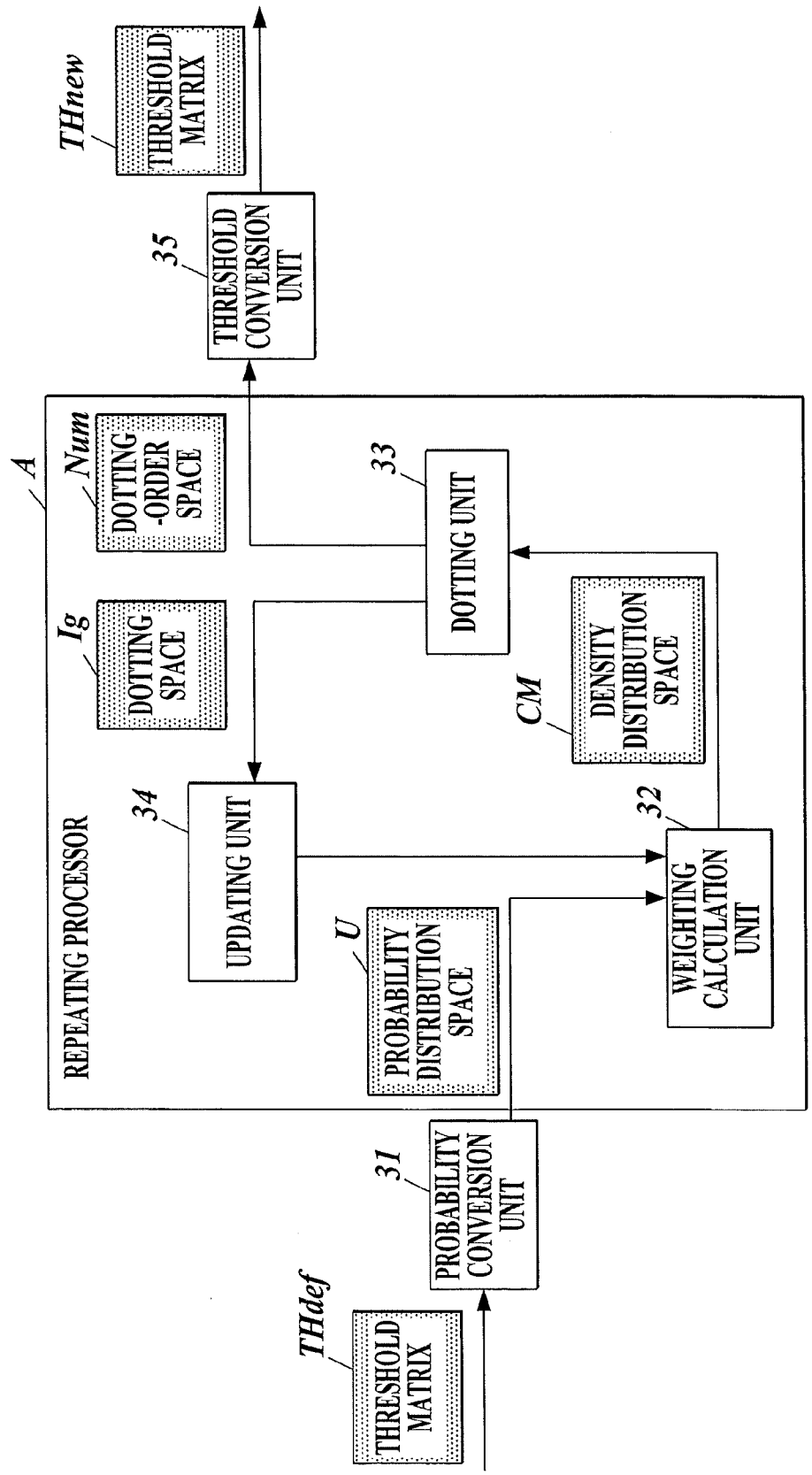
FIG. 2 is a functional block diagram of a reshaping processor.

FIG. 2 is a functional block diagram of the reshaping processor 3.

As shown in FIG. 2, the reshaping processor 3 includes a probability conversion unit 31, a repeating processor A, and a threshold conversion unit 35.

The probability conversion unit 31 receives a threshold matrix THdef to be reshaped as an initial pattern and converts the threshold matrix THdef into a probability distribution space U.

The probability conversion unit 31 uses the threshold matrix THdef preliminarily created through a conventional method of creating a threshold matrix so as to form halftone dots as an initial pattern. In the case of frequency modulation (FM) screening, the threshold matrix THdef to be used as an initial pattern is preliminarily created through the simulated-annealing method, the void-and-cluster method, or the BIP-PCCA method. The reshaping processor 3 can also reshape a threshold matrix for forming halftone dots for amplitude modulation (AM) screening, instead of the FM screening.

Each of (m×n) pixels in the threshold matrix THdef has an assigned threshold. In the screen process, each pixel value of image data is compared with the corresponding threshold, and the comparison result determines whether or not to put a dot. The thresholds of the threshold matrix THdef created through an aforementioned conventional method are set such that a group of dots gathers to form a circular halftone dot, and that the formed halftone dots are distributed at regular intervals.

The probability conversion unit 31 normalizes the respective thresholds assigned to the pixels in the threshold matrix THdef, and converts the thresholds into "0" or "1" to obtain the initial values of the probability distribution space U. When a threshold is higher, the pixel is less likely to be dotted, whereas when a threshold is lower, the pixel is more likely to be dotted. Thus, the probability distribution space U shows the probability of dotting for each pixel in the screen process using the threshold matrix THdef. Eight-bit image data with a gray level ranging from 0 to 255 has thresholds of 8-bit data with a value ranging from 0 to 255. In this case, the probability distribution space U is represented by the following equation:

$$U[i]=(255-THdef[i])/255$$

where U[i] denotes the probability of dotting at the $i^{th}$ pixel in the probability distribution space U, and THdef[i] denotes a threshold assigned to the $i^{th}$ pixel in the threshold matrix THdef.

The repeating processor A repeats a process to determine pixels to be dotted and the order of the dotting (m×n) times until the order of the dotting for all of the (m×n) pixels is determined using the probability distribution space U output from the probability conversion unit 31 as the initial values.

As shown in FIG. 2, the repeating processor A includes a weighting calculation unit 32, a dotting unit 33, and an updating unit 34.

The weighting calculation unit 32 performs weighting calculation on a density distribution space CM using the provided probability distribution space U.

The density distribution space CM, which is also referred to as a concentration matrix, is an image space with the (m×n) pixels showing the density of pixels determined to be dotted. The density distribution space CM has a range between 0 and 1, and the initial value for each pixel is "1".

The weighting calculation unit 32 multiplies the value of a pixel in the probability distribution space U by the value of the corresponding pixel of the density distribution space CM for each pixel to obtain a weighted density distribution space CM.

The weighted density distribution space CM is calculated by the following equation:

$$CMnew[i] = CMold[i] \times U[i]$$

where CMnew[i] denotes the density of the $i^{th}$ pixel in the density distribution space CM after the weighting calculation, and CMold[i] denotes the density of the $i^{th}$ pixel in the density distribution space CM before the weighting calculation.

Each of the initial values pixels of the density distribution space CM is "1". Therefore, the probability values of the probability distribution space U received from the probability conversion unit 31 are obtained as a density distribution space CMnew in the first repeating process. Since the density distribution space CM updated by the updating unit 34 is provided in the second repeating process, the weighting calculation unit 32 performs weighting calculation on the updated density distribution space CM using a probability distribution space U updated by the updating unit 34. In the subsequent repeating processes, the weighting calculation unit 32 repeats the multiplication of the probability distribution space U updated by the updating unit 34 by a density distribution space CMnew obtained in the preceding repeating process to be used as the density distribution space CMold.

The dotting unit 33 determines pixels to be dotted and the order of the dotting in accordance with the density distribution space CM whose pixel values have been weighted by the weighting calculation unit 32.

More specifically, the dotting unit 33 determines the pixels with the highest value to be dotted in the density distribution space CM weighted by the weighting calculation unit 32. The dotting unit 33 forms a dotting space Ig with (m×n) pixels, which space indicates that the pixels determined to be dotted have been dotted. Each of the pixels in the dotting space Ig has a value of either "1" or "0". The value "1" represents a dotted pixel, while "0" represents a pixel with no dot. In and after the second repeating process, some pixels have already been dotted in the preceding repeating process. If a pixel has the highest value in the density distribution space CM and the pixel is already dotted in the preceding repeating process, the dotting unit 33 excludes the dotted pixel in the dotting space Ig and determines pixels to be dotted.

In addition to the dotting space Ig, the dotting unit 33 forms a dotting-order space Num with (m×n) pixels, which space indicates the order of the dotting. The dotting-order space Num is represented by:

$$Num[i] = k$$

where Num[i] denotes the order of the dotting for the $i^{th}$ pixel in the dotting-order space Num, and "k" denotes an integer of 1 to (m×n) representing the order of dotting.

The updating unit 34 updates the density distribution space CM in accordance with the positions of the dotted pixels in the dotting space Ig in the first repeating process, and the updated distribution space CM is used in the second repeating process.

The updating unit 34 inverts the values of the pixels in the dotting space Ig and forms an image space where the dotted pixels are "0" and the pixels with no dot are "1". The image space is filtered with a low-pass filter using a circular convolution. The updating unit 34 updates the filtered image space as a new density distribution space CM. The updated density distribution space CM has a range from 0 to 1, and unsharp masking is performed on the periphery of each dotted pixel through the filtering with the low-pass filter.

The updating unit 34 performs weighting calculation on the probability distribution space U, which is used by the weighting calculation unit 32, in accordance with the position of the latest dotted pixel in the dotting space Ig, thereby updating the probability distribution space U.

Figure 3:
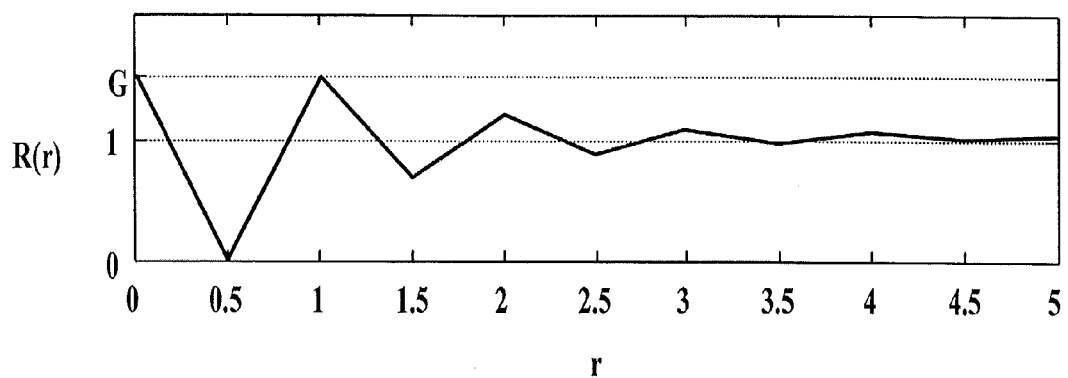
FIG. 3 is a graph showing a pair correlation function R (r)

Multiplication of a pair correlation function R(r) shown in FIG. 3 is an example of the weighting calculation. In FIG. 3, "r" denotes a euclidean distance from the latest dotted pixel in the dotting space Ig and "G" denotes an adjustment parameter. When the expression of G=1.1 is satisfied, a dot has optimal space frequency characteristics.

As shown in the pair correlation function R(r) in FIG. 3, when the expression of is satisfied, the pair correlation function R(r) to be multiplied decreases as the distance increases. On the contrary, when the expression of 0.5<r≤1 is satisfied, the pair correlation function R(r) to be multiplied increases as the distance increases. The pair correlation function R(r) finally converges to "1". In this way, a cycle of increase and decrease is repeated in the pair correlation function R(r) to be multiplied. Therefore, with regard to the periphery of each dotted pixel, a pixel farther from a dotted pixel is less likely to be dotted while a pixel a certain distance or more away from a dotted pixel is likely to be dotted again. The probability distribution space U can be weighted such that these dotting characteristics are periodically repeated. More specifically, the pair correlation function R(r) is defined to have space-frequency characteristics so that the dots gather to form circular pieces, i.e., halftone dots, which are distributed at regular intervals.

The weighting calculation with the pair correlation function R(r) is represented by:

$$Unew[i] = Uold[i] \times R(r)$$

where Unew[i] denotes the probability of dotting at the $i^{th}$ pixel in the probability distribution space U after the weighting calculation, Uold[i] denotes the probability of dotting at the $i^{th}$ pixel in the probability distribution space U before the weighting calculation, and R(r) denotes the value of the pair correlation function corresponding to the euclidean distance "r" between the latest dotted pixel and the $i^{th}$ pixel in the dotting space Ig.

When the threshold matrix THdef as an initial pattern is created by the BIPPCCA method, it is preferable that the weighting calculation use a pair correlation function R(r)

defined in the same manner as the pair correlation function R(r) used in the creation of the threshold matrix THdef. This can reshape the halftone dots to be closer to the circle defined in the creation of the threshold matrix THdef.

Figure 4:
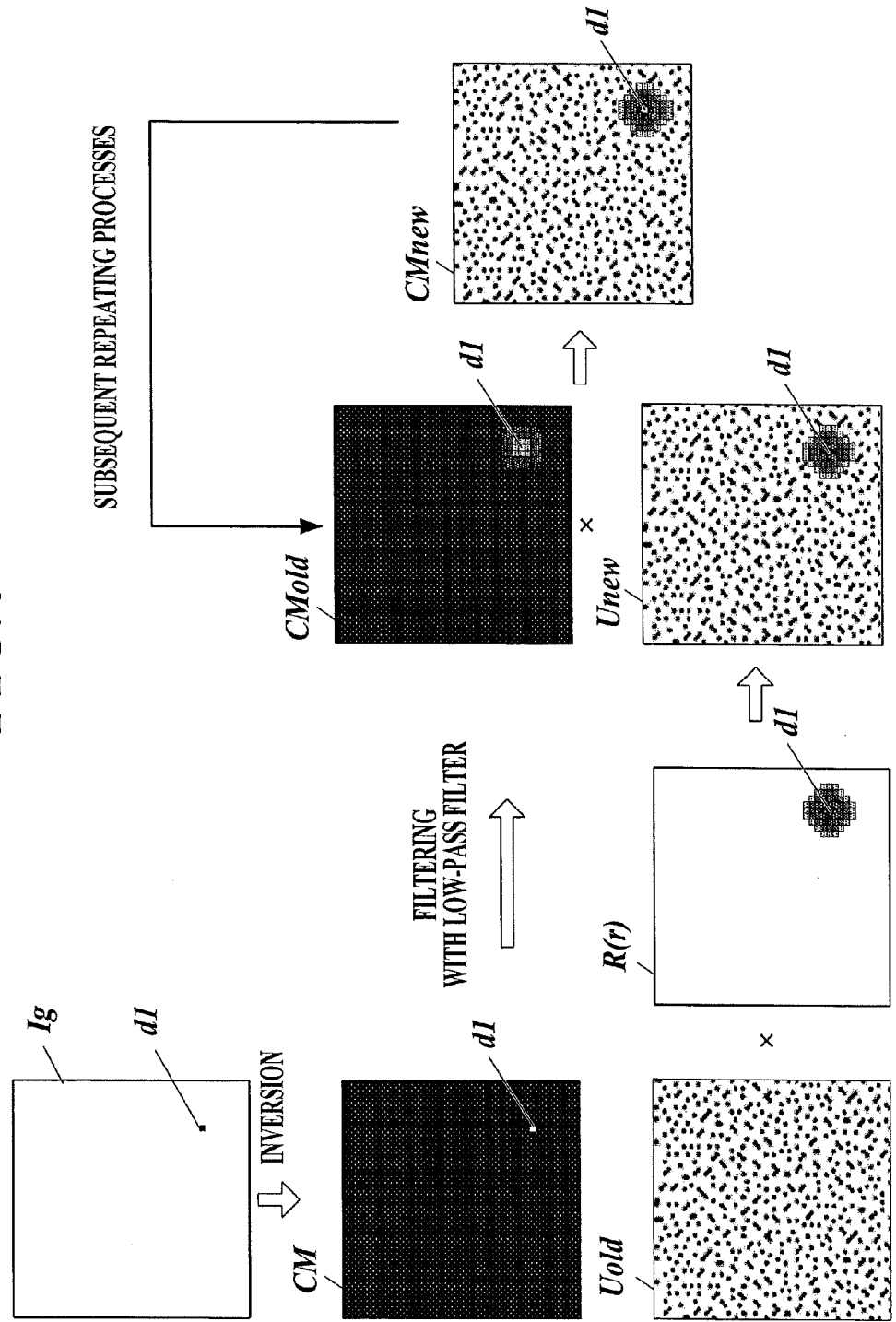
FIG. 4 is a diagram to explain the update of a density distribution space and a probability distribution space.

FIG. 4 describes the update of the density distribution space CM and the probability distribution space U by the updating unit 34. In FIG. 4, a pixel with a value closer to "1" has higher concentration while a pixel with a value closer to "0" has lower concentration.

In the first repeating process, a dotting space Ig with a dotted pixel d1 is obtained using the density distribution space CM whose pixel values are all "1", i.e., an initial value. The dotted pixels are "1" whereas the pixels with no dot are "0" in the dotting space Ig. The values "0" and "1" are inverted in the dotting space Ig and then a filtering process is performed with the low-pass filter to obtain an image space. The resultant image space is used as the density distribution space CMold in the second repeating process. As shown in FIG. 4, the values of the pixels at the periphery of the pixel d1 determined to be dotted are reduced in the density distribution space CMold.

The probability distribution space U uses the normalized values of the initial pattern in the first repeating process. The normalized values as the probability distribution space Uold are multiplied by the pair correlation function R(r) in accordance with the distance "r" from the dotted pixel d1 to be updated as the probability distribution space Unew. The probability distribution space Unew after the update is used in the second repeating process.

The density distribution space CMold and the probability distribution space Unew, which are provided for the second repeating process, are multiplied together to obtain the density distribution space CMnew. As shown in FIG. 4, the values of the pixels at the periphery of the pixel d1 are weighted concentrically in the density distribution space CMnew.

In the subsequent repeating processes, the probability distribution space Unew, which is obtained in the last repeating process, is used as the probability distribution space Uold; and the density distribution space CMnew, which is obtained in the last repeating process, is used as the density distribution space CMold.

When all the pixels are dotted in the dotting space Ig, and a dotting-order space Num indicating the order of dotting for all the pixels is obtained, the threshold conversion unit 35 converts the dotting-order space Num into a threshold matrix THnew. This conversion is represented by:

$$THnew[i]=\{Num[i]/(m\times n)\}\times g$$

where THnew[i] denotes the threshold of the $i^{th}$ pixel among the (m×n) pixels, Num[i] denotes the order of dotting of the $i^{th}$ pixel among the (m×n) pixels, and the value "g" denotes the maximum value of the gray level.

For example, in the case where a threshold matrix THdef has (32×32) pixels, the order of dotting from 1 to 1024 is assigned to the pixels in the dotting-order space Num. When each threshold of the threshold matrix THdef is 8-bit data, the maximum value "g" is 255. Therefore, the threshold THnew [i] for each pixel can be obtained by:

$$THnew[i]=Num[i]/1024\times 255$$

where Num[i] is the dotting order for a pixel.

The threshold THnew obtained by the threshold conversion unit 35 is output to the screen processor 23a. The screen processor 23a uses the threshold matrix THnew in the screen process.

Figure 5:
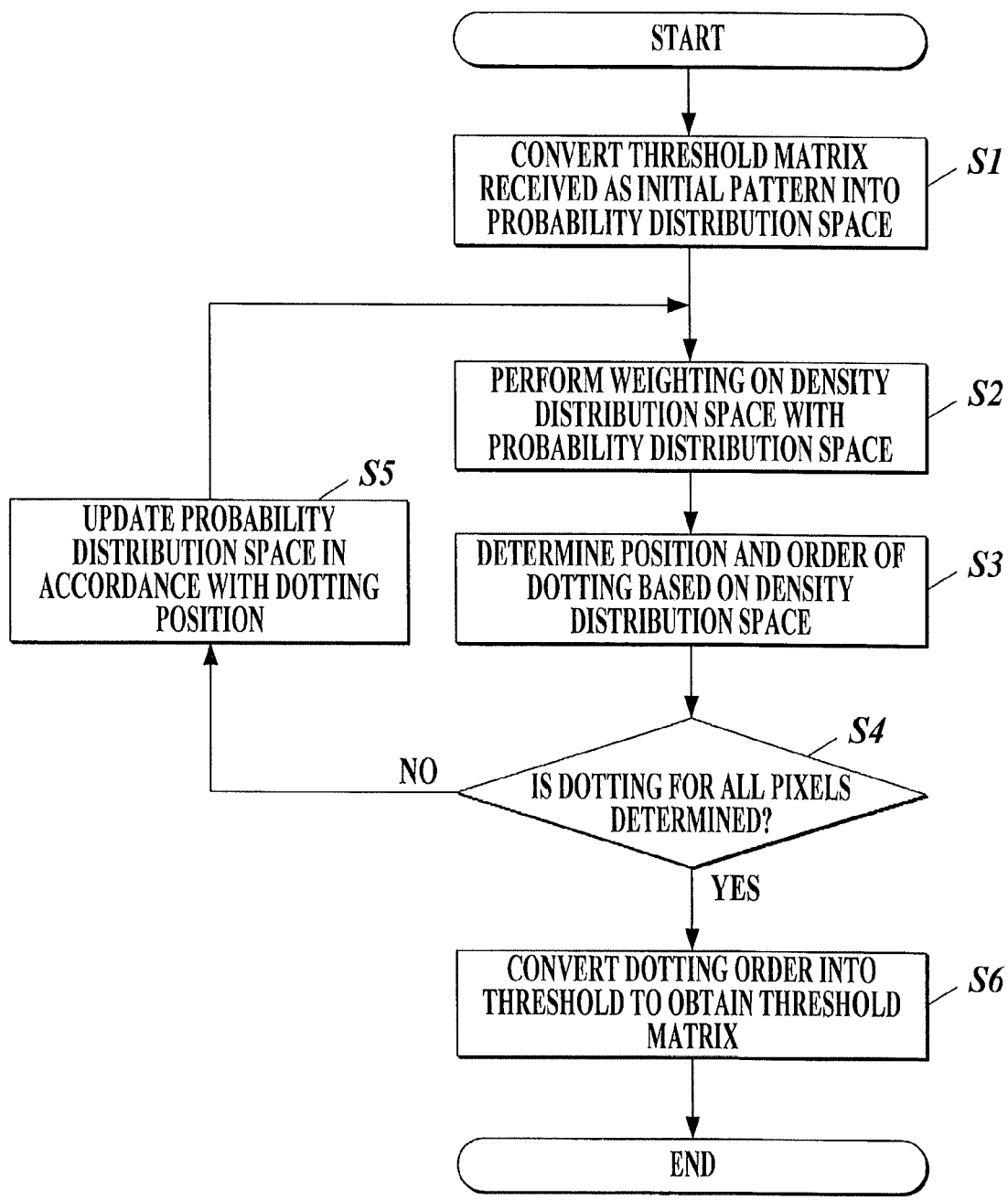
FIG. 5 is a flow chart of a reshaping process of a threshold matrix.

FIG. 5 is a flow chart of the reshaping process executed on the threshold matrix by the reshaping processor 3.

As shown in FIG. 5, the probability conversion unit 31 receives the threshold matrix THdef to be reshaped as an initial pattern and converts the threshold matrix THdef into the probability distribution space U (Step S1).

The weighting calculation unit 32 weights the density distribution space CM with the probability distribution space U received from the probability conversion unit 31 (Step S2). Here, "1" is assigned to all of the (m×n) pixels in the density distribution space CM as initial values.

The dotting unit 33 determines pixels to be dotted based on the density distribution space CM weighted by the weighting calculation unit 32 and then forms the dotting space Ig indicating the pixels are dotted. Furthermore, the dotting unit 33 determines the order of dotting for the pixels determined to be dotted and forms the dotting-order space Num indicating the order of dotting (Step S3).

If not all the pixels are dotted in the dotting space Ig (Step S4: NO), the updating unit 34 performs weighting calculation on the probability distribution space U used at the weighting calculation unit 32 in accordance with the position of the latest dotted pixel in the dotting space Ig, and updates the probability distribution space U (Step S5). In the first repeating process, the renewing unit 34 updates the density distribution space CM in accordance with the positions of the pixels which have already been dotted in the dotting space Ig.

Subsequently, the process returns to Step S2 to repeat the processes in Steps S2 to S4. More specifically, the weighting calculation unit 32 performs weighting calculation on the density distribution space CM using the updated probability distribution space U and the dotting unit 33 determines the pixels to be dotted and the order of dotting using the weighted density distribution space CM to update the dotting space Ig and the dotting-order space Num.

The weighting calculation unit 32, the dotting unit 33, and the updating unit 34 repeat their processes until dotting for all the pixels in the dotting space Ig is determined. If dotting is determined for all the pixels (Step S4: YES), the threshold conversion unit 35 converts the order of the dotting in the dotting-order space Num into thresholds to obtain a threshold matrix THnew (Step S6).

Figure 6:
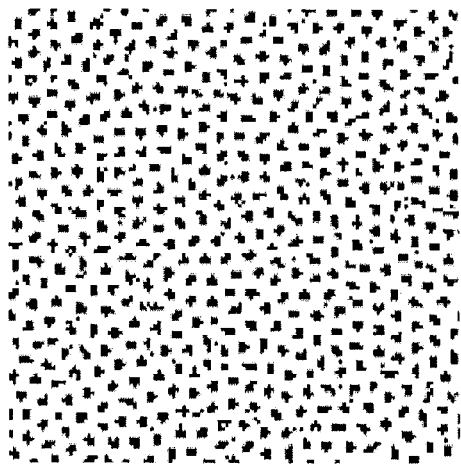
FIG. 6 is a diagram showing the results of the screen process with and without the reshaping process on the threshold matrix.
Figure 6:
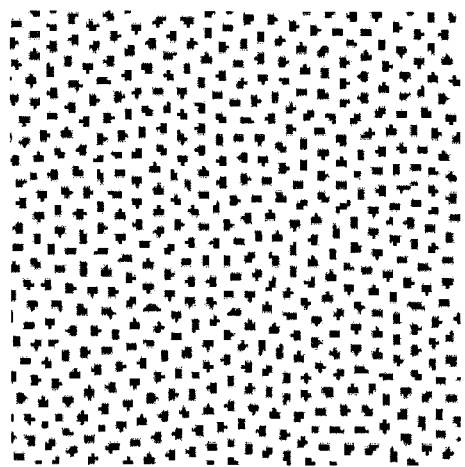

FIG. 6 shows the difference between the results of the screen process with and without the aforementioned reshaping process on the threshold matrix. In FIG. 6, the comparative example shows the result of the screen process with the threshold matrix THdef used as an initial pattern, whereas the present embodiment shows the result of the screen process with the threshold matrix THnew obtained by reshaping the threshold matrix THdef. The halftone dots formed in the present embodiment are less irregular in shape, the shape being closer to a circle with no isolated dot, compared to those of the comparative example. The halftone dots of the comparative example are grainy because of the asperities and isolated dots, which gives a blur texture.

According to the embodiment, the reshaping processor 3 of the image processor 23 includes the probability conversion unit 31, the repeating processor A, and the threshold conversion unit 35. The probability conversion unit 31 receives an initial pattern and converts the initial pattern into the probability distribution space U indicating the probability of dotting. The repeating processor A performs weighting calculation on the density distribution space CM indicating the density of the pixels determined to be dotted using the probability distribution space U. The repeating processor A determines the pixels to be dotted and the order of dotting of the pixels in the weighted density distribution space CM. The repeating processor A updates the probability distribution space U in accordance with the respective positions of the pixels determined to be dotted until the order of dotting for all the pixels in the initial pattern is determined. The repeating processor A repeats the determination of the pixels to be dotted and the order of dotting using the updated probability distribution space U. The threshold conversion unit 35 converts the order of dotting for all the pixels that are determined to be dotted into the thresholds to obtain a threshold matrix. The probability conversion unit 31 uses a threshold matrix that is preliminarily created by the simulated-annealing method, the void-and-cluster method, or the BIPPCCA method as an initial pattern.

According to the embodiment, the threshold matrix THnew defines reshaped halftone dots so that each halftone dot has an ideal shape and so that no isolated dots arise among the halftone dots. The screen process using the threshold matrix THnew can form a less grainy image, i.e., improve the quality of the image after the screen process.

Here, the ideal shape means a shape as intended by a user, which is generally a circle. The aforementioned reshaping process uses the pair correlation function R(r) designed to form a circle consisting of collected dots.

[First Modification]

The reshaping process may be repeated on the threshold matrix THnew using the threshold matrix THnew obtained through the aforementioned reshaping process as an initial pattern.

Accordingly, the halftone dots are reshaped even closer to an ideal circle, and the threshold matrix can provide a less grainy image after the screen process.

Figure 7:
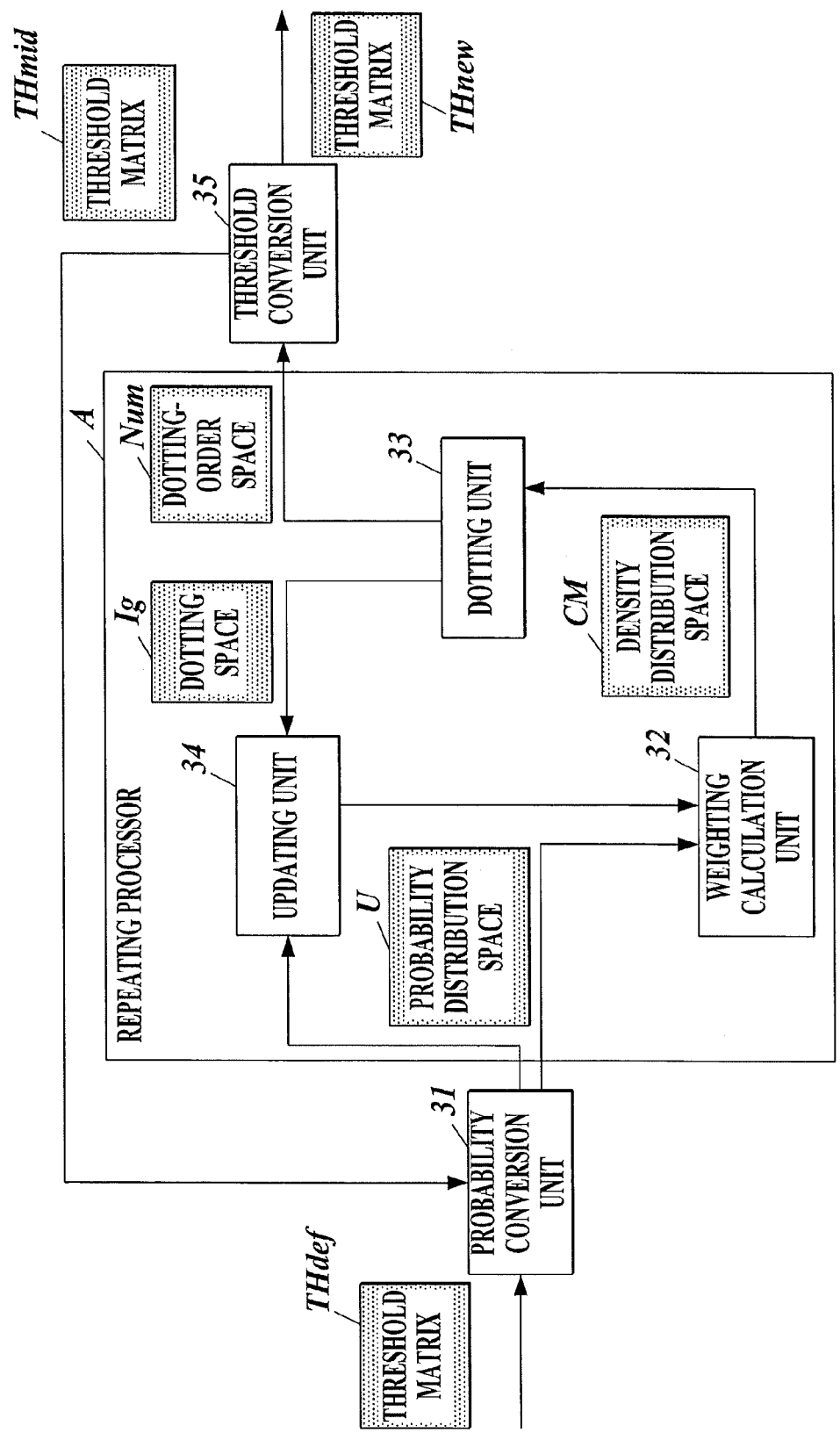
FIG. 7 is a functional block diagram of a reshaping processor which performs the reshaping process repeatedly.

FIG. 7 is an exemplary block diagram showing the configuration of the reshaping processor when the reshaping process is repeated.

As shown in FIG. 7, a threshold matrix THmid is obtained by the threshold conversion unit 35 from the reshaped threshold matrix THdef. The probability conversion unit 31 newly receives the threshold matrix THmid as an initial pattern. The reshaping process is repeated N times, and the threshold conversion unit 35 acquires and outputs a new threshold matrix THnew at the $N^{th}$ conversion. The repetition number N can be set as appropriate.

[Second Modification]

The threshold matrix THdef used as an initial pattern may be corrected in the reshaping process. More specifically, when a pixel of the threshold matrix THdef has a threshold which is significantly different from the threshold of each of the neighboring pixels and the pixel is likely to be dotted, the difference between the thresholds may be reduced, and then the threshold matrix THdef may be converted into the probability distribution space U.

A pixel which has a threshold significantly different from the threshold of each of the neighboring pixels and which is likely to be dotted is liable to produce an isolated dot because it is likely that only the pixel having the significantly-different threshold is dotted with its neighboring pixels having no dots. Such a pixel having a threshold which is likely to produce an isolated dot is detected in the correcting process and the difference between each of the thresholds is reduced, thereby preventing the occurrence of the isolated dots. The corrected threshold matrix is reshaped as an initial pattern, whereby the threshold matrix can produce a reshaped halftone dot with no isolated dots.

Figure 8:
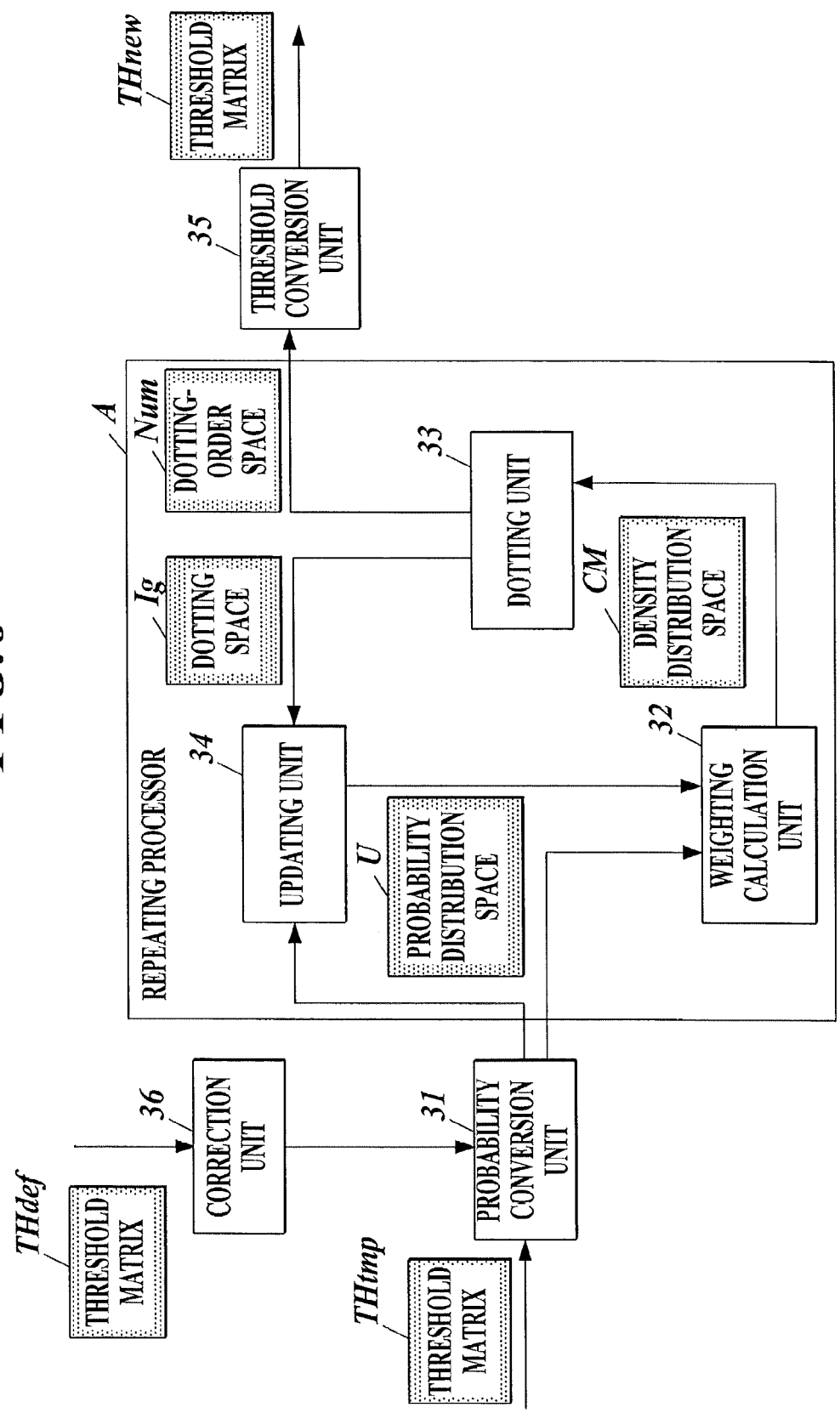
FIG. 8 is a functional block diagram of a reshaping processor which performs the reshaping process after the correction of the threshold matrix.
Figure 9:
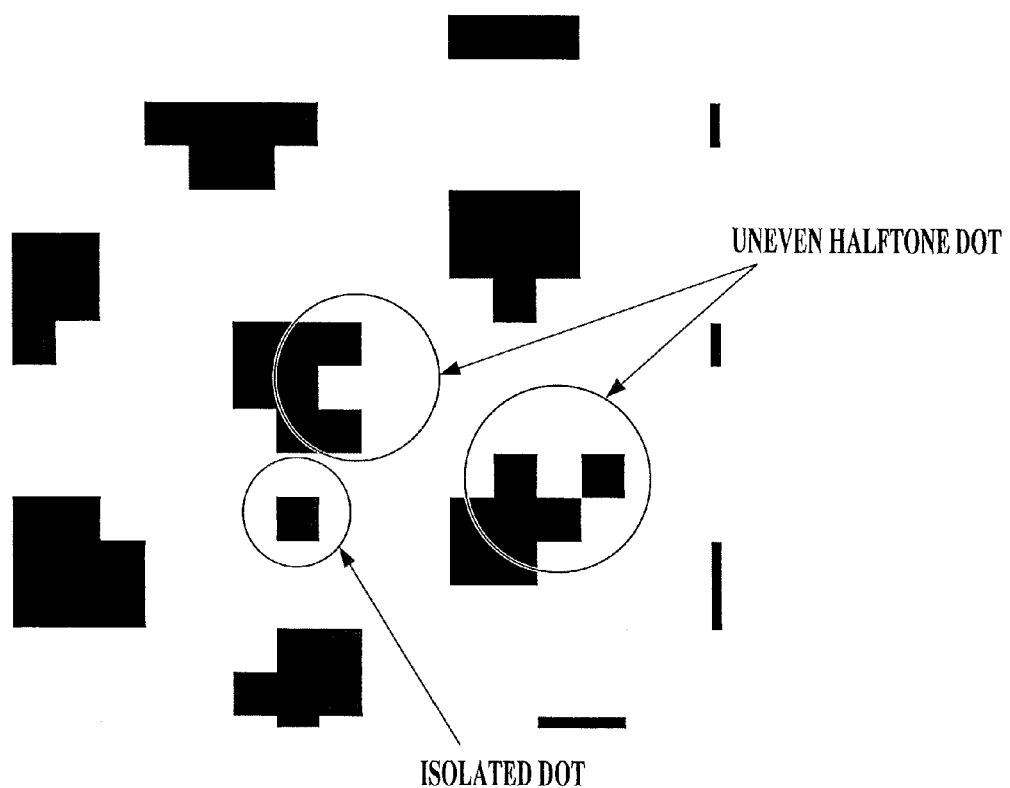
FIG. 9 is a diagram showing examples of uneven halftone dots and an isolated dot among the halftone dots formed by a screen process.

FIG. 8 is an exemplary block diagram of the configuration of the reshaping processor in the case where the threshold matrix THdef is corrected.

As shown in FIG. 8, the reshaping processor includes a correction unit 36 at a stage prior to the probability conversion unit 31.

The correction unit 36 receives a threshold matrix THdef to be reshaped and then corrects the threshold matrix THdef. More specifically, the correction unit 36 receives the thresholds of the threshold matrix THdef per (3×3) pixels and calculates the difference between the threshold of the central pixel of the (3×3) pixels and that of each of the eight neighboring pixels around the central pixel. If all of the threshold differences are equal to or larger than a predetermined value and if the threshold of the central pixel is smaller than those of the neighboring eight pixels, the correction unit 36 determines that the difference between the threshold of the central pixel and that of each of the eight neighboring pixels is large, which makes the pixel likely to be dotted. Accordingly, the correction unit 36 replaces the threshold of the central pixel of the (3×3) pixels with the average of the thresholds of the (3×3) pixels. If the difference between the threshold of the central pixel and that of at least one of the eight neighboring pixels is lower than the predetermined value, the correction unit 36 does not replace the threshold of the central pixel. The correction unit 36 performs this process in the (3×3) pixels over the entire pixels to obtain a corrected threshold matrix THtmp.

The probability conversion unit 31 receives the threshold matrix THtmp corrected by the correction unit 36 as an initial pattern and converts it into the probability distribution space U.

The subsequent reshaping processes are the same as those described above and thus the descriptions are omitted here.

The First and Second Modifications may be combined. More specifically, the corrected threshold matrix THdef is reshaped into a threshold matrix THmid, which is, in turn, repeatedly reshaped. Consequently, the isolated dots are eliminated, whereby the threshold matrix THnew provides ideally-reshaped circular halftone dots.

The above embodiment and modifications, which are mere examples of the present invention, should not be construed as limited, but may be modified within the scope of the present invention.

For example, the reshaping process on the threshold matrix shown in FIG. 5 may be executed by any of hardware and software.

In the case of using hardware, the hardware configurations shown in FIGS. 2, 7, and 8 can execute the reshaping process on the threshold matrix.

In the case of using software, the reshaping process shown in FIG. 5 is programmed and stored in the storage unit 12. The control unit 11 reads out and executes the program stored in the storage unit 12 to execute the reshaping process.

In the above embodiment and modifications, the image forming apparatus G performs the reshaping process. Instead, a computer such as a personal computer (PC) may perform the reshaping process. In this case, the reshaped threshold matrix is transmitted from a computer to the screen processor 23a of the image forming apparatus G, and the threshold matrix is used by the screen processor 23a. When a computer performs the screen process instead of the screen processor 23a, the threshold matrix may be used by the computer.

A computer readable medium having stored thereon the above-described program may be a non-volatile memory such as a read-only memory (ROM) and a flash memory or a removable medium such as a compact disc read only memory (CD-ROM). Additionally a carrier wave may also be applied as a medium to provide the data of the program according to the present invention via a communication line.

The entire disclosure of Japanese Patent Application No. 2012-025922 filed on Feb. 9, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus comprising:
a probability conversion unit that receives an initial pattern and converts the initial pattern into a probability distribution space indicating a probability of dotting;
a processor that performs weighting on a density distribution space indicating a density of pixels determined to be dotted using the probability distribution space, determines pixels to be dotted and an order of dotting of the pixels to be dotted in the weighted density distribution space, updates the probability distribution space in accordance with respective positions of the pixels determined to be dotted until the order of dotting for all pixels in the initial pattern is determined, and repeats the determination of the pixels to be dotted and the order of dotting using the updated probability distribution space; and
a threshold conversion unit that converts the order of dotting of the pixels determined by the processor into respective thresholds to obtain a threshold matrix,
wherein the probability conversion unit uses a threshold matrix preliminarily created to form a halftone dot as the initial pattern.

2. The image processing apparatus according to claim 1, wherein the threshold matrix is preliminarily created to form the halftone dot by one of a simulated-annealing method, a void-and-cluster method, and a binary pattern pair correlation construction algorithm method.

3. The image processing apparatus according to claim 1, further comprising a correction unit that corrects the preliminarily-created threshold matrix to reduce a difference between a threshold of a pixel and a threshold of each of neighboring pixels around the pixel among pixels of the preliminarily-created threshold matrix, the threshold of the pixel being significantly different from the threshold of each of the neighboring pixels and making the pixel likely to be dotted, wherein the probability conversion unit converts the corrected threshold matrix into the probability distribution space as the initial pattern.

4. The image processing apparatus according to claim 1, wherein the threshold matrix obtained by the threshold conversion unit is input to the probability conversion unit as the initial pattern to create a new threshold matrix.

5. The image processing apparatus according to claim 1, further comprising a screen processor that performs a screen process on image data using the threshold matrix obtained by the threshold conversion unit.

6. A method for reshaping a threshold matrix, the method comprising:
(a) receiving an initial pattern and converting the initial pattern into a probability distribution space indicating a probability of dotting;
(b) performing weighting on a density distribution space indicating a density of pixels determined to be dotted using the probability distribution space, determining pixels to be dotted and an order of dotting of the pixels to be dotted in the weighted density distribution space, updating the probability distribution space in accordance with respective positions of the pixels determined to be dotted until the order of dotting for all pixels in the initial pattern is determined, and repeating the determination of the pixels to be dotted and the order of dotting using the updated probability distribution space; and
(c) converting the order of dotting of the pixels determined by step (b) into respective thresholds to obtain a threshold matrix,
wherein step (a) uses a threshold matrix preliminarily created to form a halftone dot as the initial pattern.

7. The method according to claim 6, wherein the threshold matrix is preliminarily created to form the halftone dot by one of a simulated-annealing method, a void-and-cluster method, and a binary pattern pair correlation construction algorithm method.

8. The method according to claim 6, further comprising:
(d) correcting the preliminarily-created threshold matrix to reduce a difference between a threshold of a pixel and a threshold of each of neighboring pixels around the pixel among pixels of the preliminarily-created threshold matrix, the threshold of the pixel being significantly different from the threshold of each of the neighboring pixels and making the pixel likely to be dotted,
wherein step (a) converts the corrected threshold matrix into the probability distribution space as the initial pattern.

9. The method according to claim 6, wherein the threshold matrix obtained by step (c) is input to step (a) as the initial pattern to create a new threshold matrix.

10. The method according to claim 6, further comprising:
(e) performing a screen process on image data using the threshold matrix obtained by step (c).

11. A non-transitory computer-readable medium having stored thereon computer-executable instructions which, when executed, cause a computer to perform the steps of:
(a) receiving an initial pattern and converting the initial pattern into a probability distribution space indicating a probability of dotting;
(b) performing weighting on a density distribution space indicating a density of pixels determined to be dotted using the probability distribution space, determining pixels to be dotted and an order of dotting of the pixels to be dotted in the weighted density distribution space, updating the probability distribution space in accordance with respective positions of the pixels determined to be dotted until the order of dotting for all pixels in the initial pattern is determined, and repeating the determination of the pixels to be dotted and the order of dotting using the updated probability distribution space; and
(c) converting the order of dotting of the pixels determined by step (b) into respective thresholds to obtain a threshold matrix,
wherein step (a) uses a threshold matrix preliminarily created to form a halftone dot as the initial pattern.

12. The non-transitory computer-readable medium according to claim 11, wherein the threshold matrix is preliminarily created to form the halftone dot by one of a simulated-annealing method, a void-and-cluster method, and a binary pattern pair correlation construction algorithm method.

13. The non-transitory computer-readable medium according to claim 11, the medium having stored thereon the computer-executable instructions which, when executed, cause the computer to perform the further step of:
(d) correcting the preliminarily-created threshold matrix to reduce a difference between a threshold of a pixel and a threshold of each of neighboring pixels around the pixel among pixels of the preliminarily-created threshold matrix, the threshold of the pixel being significantly different from the threshold of each of the neighboring pixels and making the pixel likely to be dotted, wherein step (a) converts the corrected threshold matrix into the probability distribution space as the initial pattern.

14. The non-transitory computer-readable medium according to claim 11, wherein the threshold matrix obtained by step (c) is input to step (a) as the initial pattern to create a new threshold matrix.

15. The non-transitory computer-readable medium according to claim 11, the medium having stored thereon the computer-executable instructions which, when executed, cause the computer to perform the further step of:

(e) performing a screen process on image data using the threshold matrix obtained by step (c).

* * * * *